(No Model.)
C. S. MOSELEY.
ENDLESS CHAIN CUTTER MORTISING MACHINE.
No. 542,593. Patented July 9, 1895.
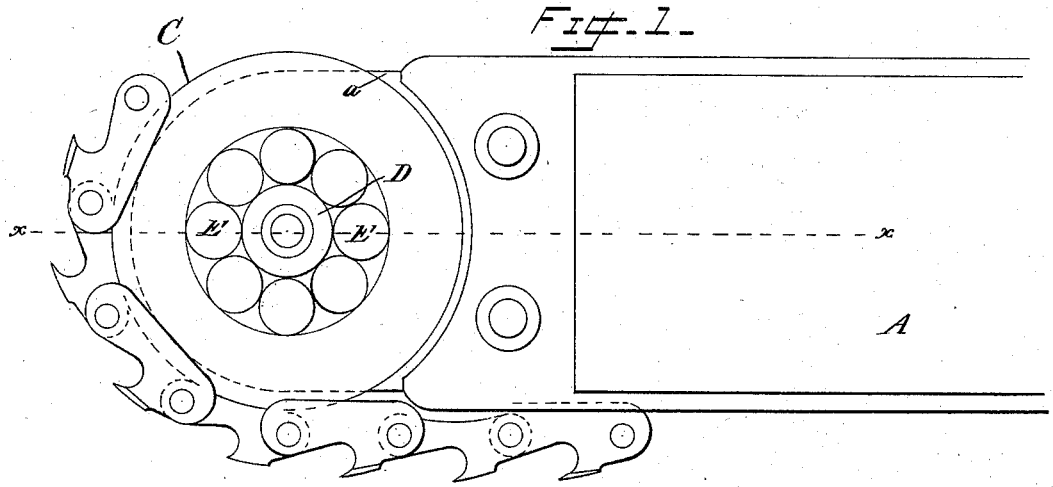
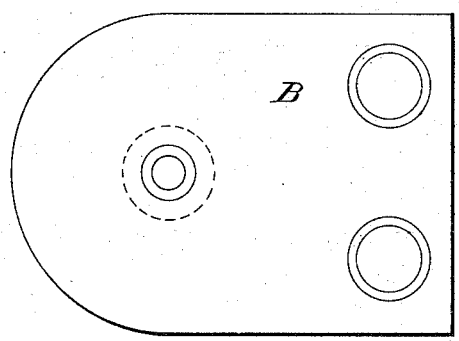
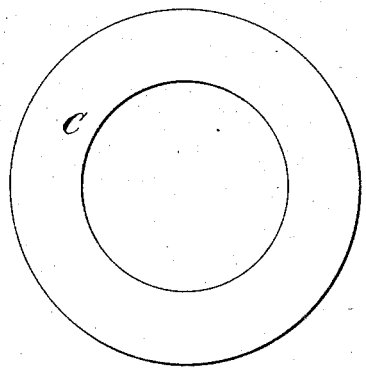
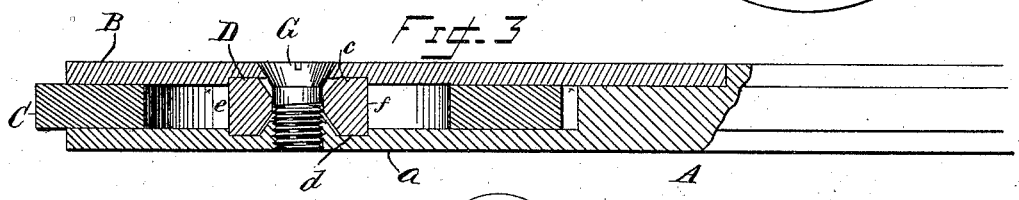
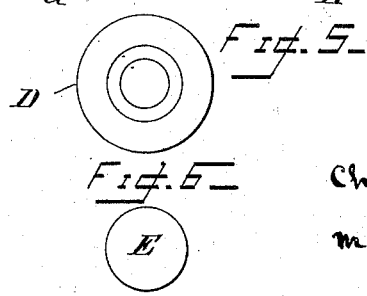
Attest.
Arthur A. Erb.
J. C. Weaver.
Inventor.
Charles S. Moseley
by
M. M. Cady, his
Attorney

UNITED STATES PATENT OFFICE.

CHARLES S. MOSELEY, OF DUBUQUE, IOWA, ASSIGNOR TO THE DUBUQUE SPECIALTY MACHINE WORKS, OF SAME PLACE.

ENDLESS-CHAIN-CUTTER MORTISING-MACHINE.

SPECIFICATION forming part of Letters Patent No. 542,593, dated July 9, 1895.

Application filed December 27, 1892. Serial No. 456,345. (No model.)

*To all whom it may concern:*

Be it known that I, CHARLES S. MOSELEY, of the city and county of Dubuque and State of Iowa, have invented a new and useful Improvement in Endless-Chain-Cutter Mortising-Machines; and I do hereby declare the following to be a full, clear, and exact description thereof, which will enable others skilled in the art to make and use the same, reference being had to the accompanying drawings, forming part of this specification, in which—

Figure 1 represents a plan view of the cutter-bar with the upper plate, Fig. 2, removed. Fig. 2 represents a plan of removable cap. Fig. 3 represents a section of Fig. 1 through the lines X X, excepting E E in Fig. 1; Fig. 4, a plan of chain-wheel disk shown in Fig. 1; Fig. 5, an end view of hub; Fig. 6, an end view of friction-roller.

Similar letters of reference where they occur in the several figures denote like parts of the apparatus in all of them.

My invention relates to improvements in mortising-machines, but has more especial reference to improvements in the cutter-bar around which the endless cutter-chain travels, and the particular object will be fully set out and shown in the following specification, in which A is the main body of my improved cutter-bar. This bar A is cut away at its lower end, leaving the plate $a$ between which and the removable plate B the chain-wheel C with its bearings are placed. At or near the center of the plate $a$ is a recess into which the removable axle D, to be hereinafter described, is secured. Around this axle D are arranged friction-rollers E E, as shown in Fig. 1. Around these rollers E E is placed the chain wheel or disk C, and over the rollers E E, axle D, and wheel C is securely fastened the plate B.

It will be readily seen that the endless cutter-chain which passes around this cutter-bar in the process of mortising will cause the wheel C to revolve at great rapidity and under severe pressure and necessarily wear its axle $b$. In the cutter-bars now in use this axle D is made integral with the plate $a$ on the bar A, and whenever this axle becomes worn the accuracy of the operation of the chain will be materially effected and necessitate the replacing of the whole cutter-bar at a great expense, whereas by constructing this axle D of a separate piece and removably securing it in the plate $a$ of the cutter-bar A, in accordance with the object of my invention it can be replaced at trifling cost and in a few minutes time. To accomplish this I construct the axle D of hardened steel, of a circular shape, and somewhat thicker than the friction-rollers E E. Through the center of this axle is a circular hole, smallest at its center and increasing to the opposite sides.

The plates $a$ and B are recessed at $c$ and $d$ sufficiently to receive the axle D; also through the plates $a$ and B are holes through which the screw G passes and securely holds the plates $a$ and B against the axle D and prevents said axle from moving in any direction, but does not prevent free movement of the friction-rollers E E and chain-wheel C.

When the wear of the axle upon its outer periphery at $e$ becomes sufficient to interfere with the free use of the cutter-chain, then the screw G may be loosened and the axle D turned half around, presenting an unworn surface in place of the worn one, and by retightening the screw the bar is ready for use. When both sides of the axle D at $e$ and $f$ are worn, the axle may be readily replaced by a new one in a few minutes time and at a trifling cost.

Having thus described my invention, what I desire to secure by Letters Patent is—

In an endless chain-cutter mortising machine, the cutter bar having the plates $a$ and B, with a recess formed in the inner surfaces of said plates, a removable axle fitting in said recesses a screw G, passing through said plates and axle, and securely holding the axle in the recesses in said plates, friction rollers E, E, disk or wheel C, and an endless chain-cutter traveling around said bar, all combined to operate, as and for the purposes described and shown.

In testimony whereof I affix my signature in presence of two witnesses.

CHARLES S. MOSELEY.

Witnesses:
M. M. CADY,
JOHN L. BUETTELL.